United States Patent Office 3,216,842
Patented Nov. 9, 1965

3,216,842
SHELLAC-HYDROXAMIC ACID COMPOSITIONS
Irving Skeist, Summit, N.J., Rock F. Martel, Stamford, Conn., and Werner R. Kuebler, Ho-Ho-Kus, N.J., assignors to Gillespie-Rogers-Pyatt Co., Inc., New York, N.Y., a corporation of Delaware
No Drawing. Filed Nov. 2, 1962, Ser. No. 235,136
20 Claims. (Cl. 106—236)

This invention relates to compositions of shellac and organic hydroxamic acids, and especially to compositions of shellac and organic hydroxamic acids in combination with organic isocyanates.

Compositions of shellac and organic isocyanates are described in copending applications Serial Nos. 235,137 and 235,138, both filed November 2, 1962. These include one-package compositions in which the isocyanate is used in less than stoichiometric ratios with respect to the hydroxyl content of the shellac so that the product is essentially a modified shellac, and compositions in which the isocyanate is used in greater than stoichiometric ratios with respect to the hydroxyl content of shellac, so that the product is a prepolymer which can be cured by atmospheric moisture. The compositions also include coatings prepared from "blocked" isocyanates which are applied to a surface and then cured by heat.

It has been found unexpectedly that organic hydroxamic acids are useful in all of the aforesaid compositions, as well as in two-package systems where the two active ingredients are blended in the proper stoichiometric proportions just before use, and the resulting composition is applied to a surface, the film dried and then cured by heating. The beneficial action is two-fold. First, the organic hydroxamic acid reacts with shellac, and especially in solutions containing it, so as to stabilize the system, possibly by reducing the functionality of the hydroxyl groups present in the shellac. Secondly, the hydroxamic acid modifies the shellac so as to make it tougher and less water sensitive. Thus, compositions prepared from shellac and organic hydroxamic acids have been found to have valuable properties, particularly as coatings.

Organic hydroxamic acids also form useful compositions when used as a substitute for a part or all of the organic isocyanate in the compositions described in the copending applications. An advantage of the use of organic hydroxamic acid in the shellac-organic isocyanate compositions is that urethanes are made without the operating difficulties which may be encountered in the use of the very reactive isocyanates alone.

When a hydroxamic acid is added to a solution of shellac and isocyanate the functionality of the shellac is reduced and a stable product results. Thus, only about 6% by weight of oleylhydroxamic acid is sufficient to give a stable one-can coating composition of shellac and toluene diisocyanate in methyl ethyl ketone. This formulation gives better gloss than with shellac itself, the other properties remaining approximately the same.

Any organic hydroxamic acid may be employed. Oleyl hydroxamic acid, commercial mixtures of $C_{16}$ and $C_{18}$ fatty hydroxamic acids, and in particular saturated and unsaturated fatty acids such as are prepared from soybean oil or cocoanut oil, are especially useful since they have a long chain fatty group which imparts both water resistance and flexibility to the modified shellac compositions prepared therefrom. Other monohydroxamic acids include acetohydroxamic acid, propiohydroxamic acid and benzohydroxamic acid. The dihydroxamic acids useful for this invention include adipodohydroxamic acid, sebacodihydroxamic acid, malonodihydroxamic acid, succinodihydroxamic acid, β-(p-methoxyphenyl)adipodihydroxamic acid, β-(p-hydroxyphenyl)adipodihydroxamic acid, m-phenylenedioxyacetohydroxamic acid, hexahydroterephthalodihydroxamic acid, β-phenyladipodihydroxamic acid, β-tertiary-amyladipodihydroxamic acid, β-methyladipodihydroxamic acid, α-ethyladipodihydroxamic acid, β-isopropyladipodihydroxamic acid, β-tertiary butyladipodihydroxamic acid, β-tertiary-amyladipodihydroxamic acid, α,α-dimethyladipodihydroxamic acid, dodecanedioicadipodihydroxamic acid, and the like.

Dewaxed, decolorized shellac may be considered as representative of "pure" shellac resin, and is used in the examples unless otherwise indicated. Other types of shellac may be employed. Natural shellac contains wax, red coloring matter and moisture. Generally, when the natural resin is used the solution of the shellac in the solvent can be decanted off from the wax which settles out. Orange shellac is unbleached shellac which may be in the form of flakes, sheets, buttons and the like. It may be employed in any formulations where the color is unobjectionable.

A wide variety of organic isocyanates may be employed, ranging from simple monoisocyanate compounds up to polymeric materials containing isocyanate groups. Examples of isocyanate compounds include the monoisocyanates, such as the alkyl isocyanates; ethyl isocyanate, butyl isocyanate and octadecyl isocyanate; the aryl monoisocyanates, such as phenyl isocyanate, α-naphthyl isocyanate, and the like; the diisocyanates, such as the polymethylene diisocyanates, for example ethylene diisocyanate, trimethylene diisocyanate, 2-chlorotrimethylene diisocyanate, tetramethylene diisocyanate, pentamethylene diisocyanate, and hexamethylene diisocyanate; alkylene diisocyanates, for instance propylene-1,2-diisocyanate, butylene-1,2-diisocyanate and butylene-1,3-diisocyanate; alkylidene diisocyanates, such as ethylidene diisocyanate and heptylidene diisocyanate, cycloalkylene diisocyanates, for example, cyclopentylene-1,3-diisocyanate, cyclohexylene-1,4-diisocyanate and cyclohexylene-1,2-diisocyanate; cycloalkane diisocyanates, for instance cyclohexane-1,4-diisocyanate; and 1,8-diisocyano-p-menthane, dicyclohexylmethane diisocyanate; aromatic diisocyanates, for instance methylene bis(p-phenylene isocyanate) which is known as "MDI" and polymethylene polyphenylisocyanate ("PAPI"); p-phenylene diisocyanate, 1-methylphenylene-2,4-diisocyanate, naphthylene-1,4-diisocyanate, 2,6-toluene diisocyanate, 2,4-toluene diisocyanate, xylene-1,3-diisocyanate, 4,4'-diphenylene methane diisocyanate, 4,4'-diphenylenepropane diisocyanate, benzidine diisocyanate, tolidine diisocyanate, and the like; corresponding tri, tetra, etc. isocyanates, such as 1,2,4-benzene triisocyanate, triphenylmethane triisocyanate, diphenylmethane tetraisocyanate, and the like. The aromatic nucleus of an aryl isocyanate is preferably the benzene ring. The aromatic ring may be substituted with groups which are non-reactive with isocyanate groups, such as alkyl or halogen. For simplicity, the term "isocyanate" is used throughout this specification to mean organic isocyanates.

The toluene diisocyanate referred to in the discussion and in the examples is an 80/20 mixture of 2,4-toluene diisocyanate and 2,6-toluene diisocyanate. This mixture is generally the preferred reactant because of its low cost. The 2,4-isomer may be used if lower viscosity materials are desired. The 80/20 isomeric mixture is the product naturally resulting from the dinitrating of toluene, reducing this product to the diamine, and then treating it with phosgene.

Superior coatings utilizing shellac as a basic material are prepared by incorporating other reactive organic materials. For example, polyols with less functionality than shellac may be added to increase flexibility and toughness, or to impart other special properties, such as gloss or adhesion. Addition agents which have been found to be particularly useful for this purpose are the polyoxyalkylene condensate polyols which are commercially available from the reaction of a variety of polyols with alkylene oxides, especially proplyene oxide and ethylene oxide. Typical of these base chemicals are the diols, diethylene glycol, propylene glycols; triols such as glycerine, trimethylolpropane and hexanetriol-1,2,6, as well as polyols such as sorbitol, pentaerythritol, methyl glucoside, sucrose and tetra(hydroxypropyl)ethylenediamine.

Polyether-polyols are known under various trade names such as Pluracol, Pluronic and NIAX. In the examples, "Pluracol TP-440" is a 400 molecular weight product which is made by the addition of propylene oxide to trimethylolpropane; "Pluronic L-61" is a diol of equivalent weight 1000 having terminal primary hydroxyl groups, which contains the sequence polyethylene oxide-polypropylene oxide-polyethylene oxide; NIAX 2025 is a polypropylene diol of the above described type. Polyester-polyols are also useful as addition agents for the compositions of this invention. Polyols of moderately high molecular weight are made by the reaction of low molecular weight polyols, in excess of stoichiometric amounts, with dibasic acids. A typical polyester-diol of this type is prepared by esterifying adipic acid with a slight excess of ethylene glycol.

The particular polyol used in a given formulation may be varied to suit a special use. Combinations of polyols may be employed. Thus a wide selection and combination of properties may be obtained by the addition of comparatively low cost polyols in the shellac-isocyanate coatings. The outstanding properties of these coatings are a combination of hardness and flexibility, abrasion resistance, and good water and chemical resistance. Excellent weather resistance is found in many of the coatings.

It is an advantage that the polyol can serve also, wholly or in part, as a solvent for the shellac, making unnecessary the addition of other shellac solvents, such as methyl ethyl ketone. Thus polyols can be used to afford a solvent-free system which can be used for castings as well as coatings. Systems pigmented for example, with titanium oxide, red iron oxide, ferrite yellow, and the like may be prepared by ball milling the pigment with the polyol. Compositions containing color may also be prepared by dissolving a soluble dyestuff, previously dried to remove moisture, in the solvent which is used for dissolving the shellac.

The first step in the preparation of the coatings of our invention is to prepare an anhydrous solution of shellac and organic hydroxamic acid in a solvent which is inert to shellac and to organic isocyanates. Any inert solvent, or mixture of solvents, may be used that will afford clear solutions which can be made anhydrous, which will have physical characteristics suitable for coatings, especially with regard to viscosity, and which are sufficiently stable that the shellac will not reprecipitate on standing at room temperature. The preferred solvents for our invention are methyl ethyl ketone, cyclohexanone, and mixtures of the two. Dioxane can also be employed.

Shellac and organic hydroxamic acid dissolve in hot methyl ethyl ketone, but at some concentrations the shellac tends to reprecipitate on standing at room temperature. Cyclohexanone dissolves shellac at 90° C., giving crystal clear shellac solutions which remain stable on cooling. The addition of only about 5 parts of cyclohexanone to about 95 parts of methyl ethyl ketone results in a stable shellac solution and this is a preferred solvent mixture for shellac-isocyanate coatings. Other mixtures of cyclohexanone and methyl ethyl ketone can also be used.

Any instability of shellac in methyl ethyl ketone can also be overcome by the incorporation of certain polyols. Although 30 parts of shellac is soluble in 70 parts of Pluracol TP-440 (a 400 molecular weight product made by the addition of propylene oxide to trimethylolpropane) to give a stable solution, the use of lesser amounts of Pluracol produces a more viscous solution which, although clear, requires high temperatures for fluidity.

It is important that the shellac solution be made anhydrous due to the reaction of water with isocyanates. The amount of water in a shellac solution can be reduced to less than about 0.02% by having present another liquid as a carrier for the water vapor, which liquid will not boil at too high a temperature, so that on distillation the shellac will not lose plasticity through a heat activated reaction. The preferred liquids are those which form lower boiling azeotropes with water, such as benzene, toluene, xylene, ethylbenzene, and aliphatic hydrocarbons from $C_5$ to $C_{10}$. Using toluene, for example, the shellac is dissolved in a solvent such as methyl ethyl ketone (or a mixture of methyl ethyl ketone and cyclohexanone), toluene is added, and the mixture is then distilled, the water being carried off with the first distillate in the form of a toluene-water azeotrope.

The organic isocyanate is then added to the solution of shellac and organic hydroxamic acid. The resulting reaction may be caused to go substantially to completion, by heating, if necessary, to form a solution which is stable on storage at ambient temperature. The stable composition is then applied to a surface as a coating. The organic hydroxamic acid-shellac-organic isocyanate may also be applied immediately to a surface, the solvent allowed to evaporate, and the film cured, by heat if necessary. The sum of the hydroxmic acid and isocyanate groups is used in calculating stoichiometric amounts with respect to the shellac hydroxyls.

The adduct of the organic isocyanate with a blocking agent is prepared by mixing the two ingredients at a temperature below the decomposition temperature of the adduct, and preferably at a temperature within the range of approximately 20° to 35° C. In most instances the reaction will proceed satisfactorily at room temperature. Since the reaction is exothermic it may be necessary to apply cooling to maintain a controlled lower temperature. The time required for the adduct to form will vary from a few minutes to several hours depending upon the particular reactants used. Usually a slight excess of the isocyanate is preferred. A solvent such as toluene, methyl ethyl ketone or o-dichlorobenzene which is inert to both the shellac and the iscyanate may be employed.

The shellac solution containing the organic hydroxamic acid is then mixed with the isocyanate adduct in proportions such that the shellac hydroxyls are approximately equivalent to the sum of the isocyanate and hydroxamic groups. A stable coating composition results. The coating is applied to a substrate in the usual manner by brush, spray or dip methods. The solvent is permitted to evaporate and the film which forms is cured by heating, for example, in an oven. The temperature of the cure will vary with the particular isocyanate adduct employed, but is generally in the range of 80° to 250° C.

To prepare a shellac composition which is modified by hydroxamic acid alone, an anydrous solution of shellac and the hydroxamic acid are mixed, stirred and heated to a temperature which varies according to the particular hydroxamic acid used. The preferred temperature using oleyl hydroxamic acid is within the range of 75° to 85° C. The above composition is coated on a surface and dried at room temperature to form a coating having better gloss than shellac alone.

The following are examples that serve to illustrate but do not limit my invention. In the following examples the hydroxyl equivalent of shellac has been taken as 225, but it must be understood that shellac, being a natural product, may have a greater or lesser hydroxyl equivalent weight depending on its origin or its processing history.

*Example 1*

|  |  | phs.[1] | Equivalents |
|---|---|---|---|
| Shellac | 4 grams | 94.1 | 0.018 |
| Oleyl hydroxamic acid | 0.25 gram | 5.9 | 0.001 |
| Methyl ethyl ketone | 10.0 ml | 235 |  |

[1] Parts per hundred solids

The shellac, oleyl hydroxamic acid, and methyl ethyl ketone are mixed, stirred and heated to about 80° C. The resulting solution is coated on oak wood and dried at room temperature. The coating has better gloss than a coating from shellac alone, the other properties of the coating remaining about the same as for the unmodified shellac. When the amount of the oleyl hydroxamic acid is varied 2.5 parts up to 11 parts, coatings are obtained which are tough and water resistant.

In accordance with the above procedure, but substituting equivalent quantities of benzohydroxamic acid for the oleyl hydroxamic acid in the above formulation a superior water resistant coating is obtained.

*Example 2*

|  |  | phs.[1] | Equivalents |
|---|---|---|---|
| Shellac | 4.0 grams | 63.8 | 0.0177 |
| Methyl ethyl ketone | 10.0 ml |  |  |
| Oleyl hydroxamic acid | 2.0 grams | 31.9 | 0.0072 |
| Toluene diisocyanate | 0.28 gram | 4.46 | 0.0032 |
| —NCO/—OH |  | 0.60 | 0.0104 |

[1] Parts per hundred solids.

The shellac is mixed with oleyl hydroxamic acid and methyl ethyl ketone, and the mixture is heated to a 80° C to dissolve the shellac completely. The solution is then cooled to room temperature and the toluene diisocyanate is slowly added. After about an hour, the resulting coating mixture is coated on oak wood.

In the above formulation the isocyanate ratio is varied from 1.5 to 0.2 with satisfactory results. Hardness and gloss increase with increase in —NCO/—OH ratio. At the highest isocyanate ratio, the coatings have excellent gloss, are harder than shellac, and are resistant to water, 5% salt solution, and detergent.

*Example 3*

|  |  | phs.[1] | Equivalents |
|---|---|---|---|
| Shellac | 4 grams | 48.5 | 0.018 |
| Methyl ethyl ketone | 40 ml |  |  |
| Toluene | 5 ml |  |  |
| Oleyl hydroxamic acid | 0.25 gram | 3.0 | 0.001 |
| Toluene diisocyanate | 4.0 grams | 48.5 | 0.046 |
|  |  |  | 0.047 |
| —NCO/—OH | 2.66 |  |  |

[1] Parts per hundred solids.

The shellac is added to the mixture of methyl ethyl ketone, toluene, and oleyl hydroxamic acid. The toluene and any water present are removed by azeotropic drying. When all of the toluene and water have been removed, the reaction flask is cooled to below 32° C. and the toluene diisocyanate is added. When the initial exothermic reaction subsides, the reaction flask is heated to 88° C. for about three hours. The product is coated on oak wood and cured by reaction of moisture from the air. The coating is tough and has good water resistance.

*Example 4*

|  |  | phs.[1] | Equivalents |
|---|---|---|---|
| Shellac | 15 grams | 45.4 | 0.067 |
| Methyl ethyl ketone | 150 ml | 450 |  |
| Toluene | 10.0 ml | 30 |  |
| Oleyl hydroxamic acid | 1.0 gram | 3.2 | 0.004 |
| Toluene diisocyanate | 17.0 grams | 51.7 | 0.197 |
| —NCO/—OH |  | 3.0 |  | 0.201 |

[1] Parts per hundred solids.

The shellac, oleyl hydroxamic acid, methyl ethyl ketone, and toluene are mixed together and heated to boiling. A volume of the toluene/water azeotrope is distilled off equal to the volume of the toluene originally added. The mixture is then cooled to below 52° C. Toluene diisocyanate is then added, with agitation, at such a rate that the temperature of the reaction mass does not exceed 40° C. The product is coated on glass plate and cured at room temperature. The coating has good adhesion, gloss, and resistance to water and salt spray.

In accordance with the above procedure, but using an equivalent quantity of polymethylene polyphenylisocyanate (PAPI) in place of the toluene diisocyanate, coatings with similar properties are obtained.

*Example 5*

|  |  | phs.[1] | Equivalents |
|---|---|---|---|
| Shellac | 15 grams | 40.7 | 0.067 |
| NIAX 2025 | 3 grams | 8.12 | 0.003 |
|  |  |  | 0.070 |
| Methyl ethyl ketone plus 0.25% dye.[2] | 150 ml |  |  |
| Toluene | 10 ml |  |  |
| Oleyl hydroxamic acid | 1 gram | 2.7 | 0.004 |
| Toluene diisocyanate | 17.9 grams | 48.5 | 0.206 |
| —NCO/—OH |  | 3.0 |  |

[1] Parts per hundred solids.
[2] The dye is Colliton Fast Black BTNA.FS. Any moisture present in the dye must be first removed, for example, by drying in the oven before it is dissolved in the methyl ethyl ketone.

The shellac is added to the methyl ethyl ketone and toluene; the oleyl hydroxamic acid is then added and the mixture heated to boiling. A volume of toluene/water azeotrope is distilled off equal to the volume of the toluene originally added. The toluene diisocyanate is then mixed with the NIAX 2025 and this mixture is added to the anhydrous shellac solution, while maintaining the temperature at 45° C. The resulting composition is applied to leather and cured by reaction with moisture from the air. The composition is applied to wood and the coating has good gloss, water resistance, hardness, alkali resistance, and alcohol resistance.

In accordance with the above procedure, but using an equivalent quantity of methylene bis(p-phenylene isocyanate) (MDI) in place of the toluene diisocyanate, coatings with similar properties are obtained.

*Example 6*

|  |  | phs.[1] | Equivalents |
|---|---|---|---|
| Shellac | 4 grams |  | 0.0178 |
| Methyl ethyl ketone (dry) | 10.0 ml |  |  |
| Oleyl hydroxamic acid | 0.25 gram |  | 0.001 |
| Cyclohexanol | 7.0 grams |  |  |
| Toluene diisocyanate | 3.0 grams |  | 0.0345 |
|  |  |  | 0.355 |
| —NCO/—OH |  | 2.0 |  |

[1] Parts per hundred solids.

The shellac and oleyl hydroxamic acid are dissolved in the methyl ethyl ketone by heating at about 70° C. The toluene diisocyanate is mixed with cyclohexanol to form an adduct which is then mixed with the shellac solution.

We claim:

1. A coating composition that is stable at ambient temperatures comprising shellac and an organic hydroxamic acid in an inert anhydrous organic solvent.

2. A coating composition that is stable at ambient temperatures which consists essentially of the product formed by heating shellac and an organic hydroxamic acid in an inert anhydrous organic solvent.

3. A coating composition that is stable at ambient temperatures which consists essentially of the product formed by heating shellac and an organic hydroxamic acid in an inert anhydrous organic solvent at a temperature within the range of 70° and 85° C., wherein said organic hydroxamic acid is in a stoichiometric proportion of about 0.02 to 1.0 with respect to the hydroxyl content of the shellac.

4. The coating composition of claim 1 wherein said organic hydroxamic acid is derived from fatty acids containing from about 16 to 18 carbon atoms.

5. The coating composition of claim 1 wherein said organic hydroxamic acid is oleyl hydroxamic acid.

6. The coating composition of claim 1 wherein said organic hydroxamic acid is benzohydroxamic acid.

7. The coating composition of claim 1 wherein said solvent is selected from the group consisting of dioxane, methyl ethyl ketone, cyclohexanone and mixtures of methyl ethyl ketone and cyclohexanone.

8. The coating composition of claim 1 wherein said solvent is a mixture of 5 parts by weight of cyclohexanone and 95 parts by weight of methyl ethyl ketone.

9. A process for perparing a coating composition that is stable at ambient temperatures which comprises admixing shellac with an organic hydroxamic acid in an inert anhydrous, organic solvent and heating to a temperature within the range of about 70° and 85° C.

10. The process of claim 9 wherein said organic hydroxamic acid is derived from fatty acids containing from about 16 to 18 carbon atoms.

11. The process of claim 9 wherein said organic hydroxamic acid is oleyl hydroxamic acid.

12. The process of claim 9 wherein said organic hydroxamic acid is benzohydroxamic acid.

13. The process of claim 9 wherein said solvent is selected from the group consisting of dioxane, methyl ethyl ketone, cyclohexanone and mixtures of methyl ethyl ketone and cyclohexanone.

14. The process of claim 9 wherein said solvent is a mixture of 5 parts by weight of cyclohexanone and 95 parts by weight of methyl ethyl ketone.

15. A process for preparing a coating composition that is stable at ambient temperatures which comprises admixing shellac with an organic hydroxamic acid in an inert anhydrous, organic solvent to which has been added a hydrocarbon which forms a lower boiling azeotrope with water, and distilling off the hydrocarbon/water azeotrope.

16. The process of claim 15 wherein said hydrocarbon is selected from the group consisting of benzene, toluene, xylene, ethyl benzene and aliphatic hydrocarbons containing from 5 to 10 carbon atoms.

17. A process of coating a surface which comprises applying to said surface a coating composition which is stable at ambient temperatures, comprising shellac, an organic hydroxamic acid, and an anhydrous organic solvent which is inert to said shellac and hydroxamic acid, and exposing the resulting coated surface to the air to permit the solvent to evaporate and a coating film to form on said surface.

18. A process for preparing a coating composition which is stable at ambient temperature, which comprises admixing shellac with an organic sydroxamic acid in an inert anhydrous solvent at a temperature within the range of 70° to 85° C., cooling, and then slowly adding an organic isocyanate while maintaining the temperature below about 30° to 55° C., and finally heating at 70–90° C. for several hours.

19. A process for preparing a coating composition which is stable at ambient temperatures, which comprises admixing shellac with an organic hydroxamic acid in an inert solvent to which has been added a hydrocarbon which forms a lower boiling azeotrope with water; distilling off the hydrocarbon/water azeotrope; cooling, and then slowly adding an organic isocyanate while maintaining the temperature below about 30° to 55° C.

20. A process of coating a surface which comprises applying to said surface a coating composition which is stable at ambient temperatures, comprising shellac, an organic hydroxamic acid, a blocked organic isocyanate and a solvent which is inert to the shellac and isocyanate; exposing the resulting coating surface to the air to permit the solvent to evaporate and a coating film to form on said surface; and then curing said coating film by heat.

References Cited by the Examiner
UNITED STATES PATENTS
3,061,557   10/62   Hostettler et al. _____ 106—236

ROBERT F. WHITE, *Primary Examiner.*
MORRIS LIEBMAN, *Examiner.*